United States Patent [19]

Tilghman

[11] 4,226,388
[45] Oct. 7, 1980

[54] TOY PARACHUTE RELEASABLE FROM A KITE STRING

[76] Inventor: Bill W. Tilghman, 5604 W. Palo Verde Ave., Glendale, Ariz. 85302

[21] Appl. No.: 50,987

[22] Filed: Jun. 22, 1979

[51] Int. Cl.³ .................. B64C 31/06; A63H 27/08
[52] U.S. Cl. ................................................ 244/155 R
[58] Field of Search ................................... 244/155 R

[56] References Cited

U.S. PATENT DOCUMENTS

| | | | |
|---|---|---|---|
| 1,086,888 | 2/1914 | Bochau | 244/155 R |
| 2,452,746 | 11/1948 | Giara | 244/155 R |
| 3,698,671 | 10/1972 | Barry | 244/155 R |
| 3,768,762 | 10/1973 | George | 244/155 R |
| 4,141,521 | 2/1979 | Waldvogel | 244/155 R |

*Primary Examiner*—Barry L. Kelmachter
*Attorney, Agent, or Firm*—Tod R. Nissle; William H. Drummond

[57] ABSTRACT

A toy parachute for being attached to and traveling up a kite string with the wind and for being released from the string for free flight to the ground. The toy includes a weight, a parachute having shroud lines attached to the weight, a carrier mechanism connected to the weight for movably engaging the kite string, and a mechanism for releasing the carrier device from the string. One embodiment of the toy parachute includes an aerodynamic device having an aperture which permits the carrier mechanism to pass therethrough and engage the string, and which prevents the weight from similarly passing through the aperture. When the carrier mechanism is released from the string, the aerodynamic device and parachute toy separate and individually free flight to the ground. In a second embodiment of the invention, the carrier mechanism comprises a pulley having a groove formed therearound for rotatably engaging the kite string. In the third embodiment of the invention, the release mechanism consists of an elongate member having a conical surface shaped such that the carrier device travels on to and off of the conical surface into the air.

1 Claim, 17 Drawing Figures

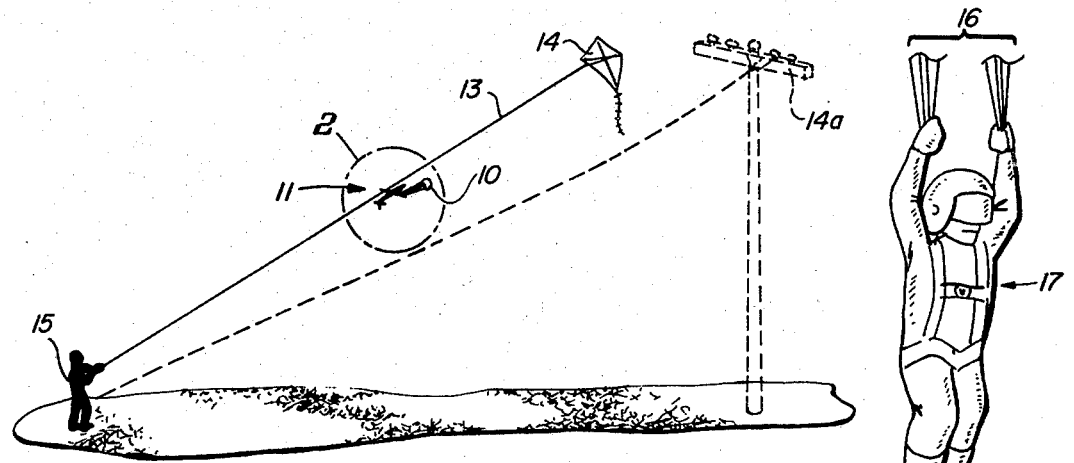
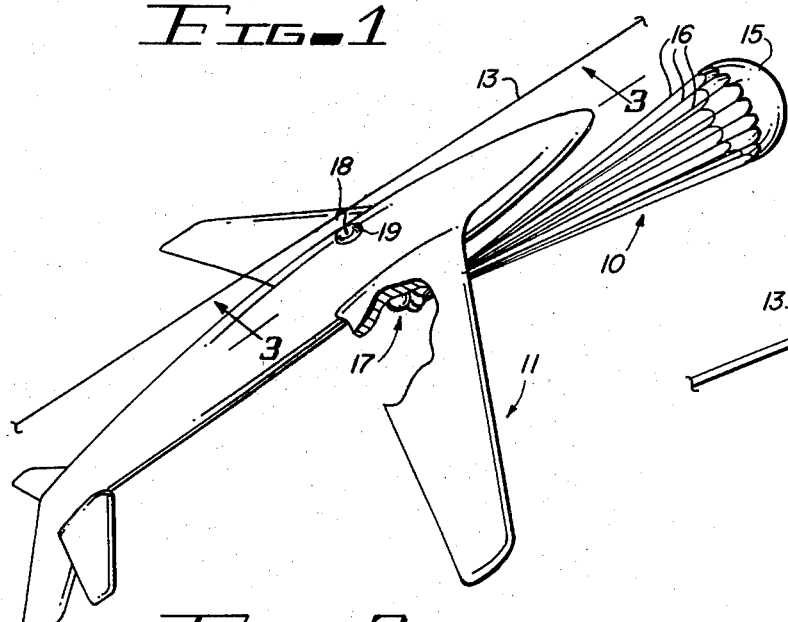
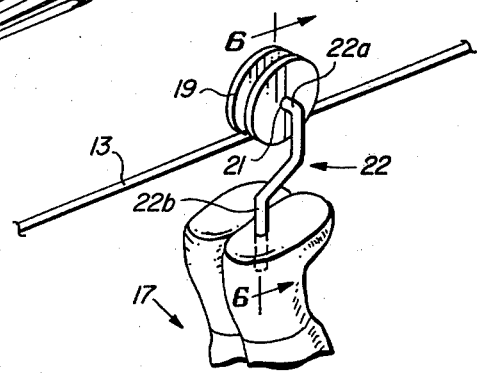
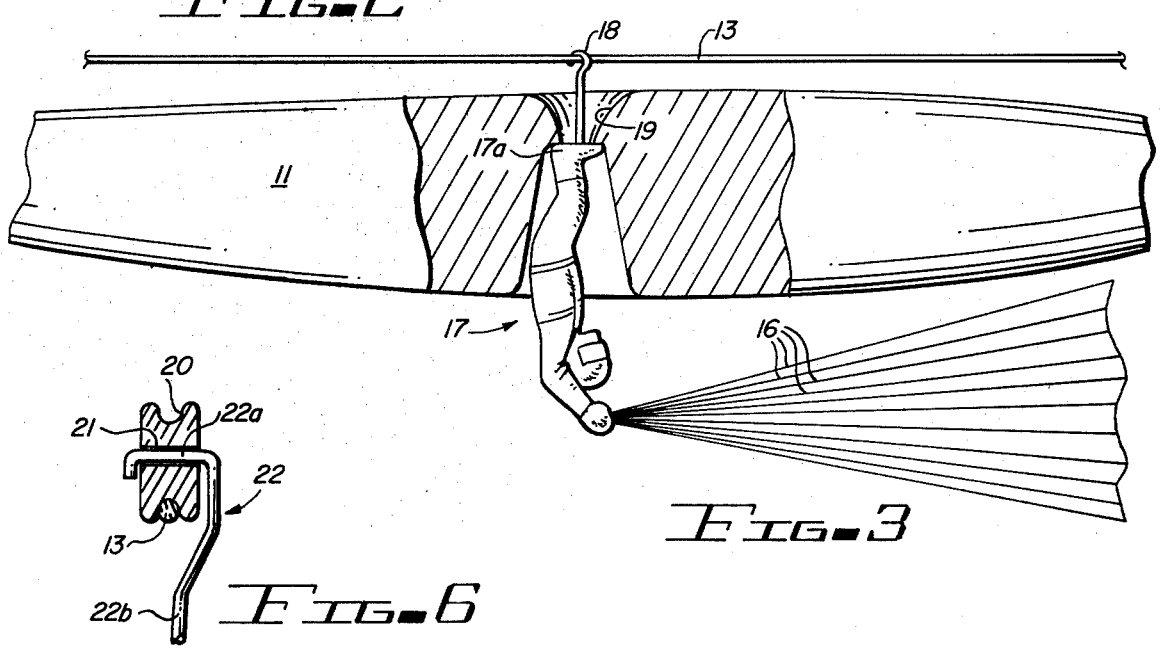

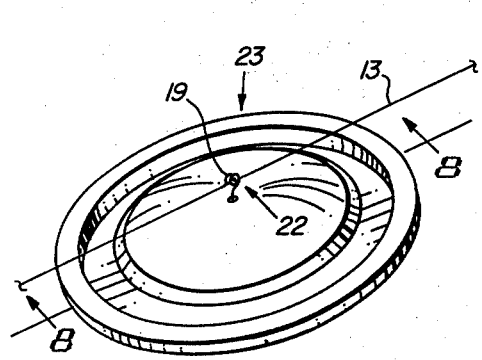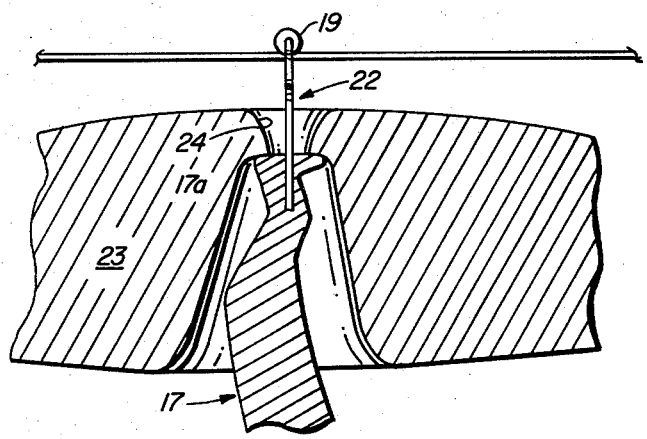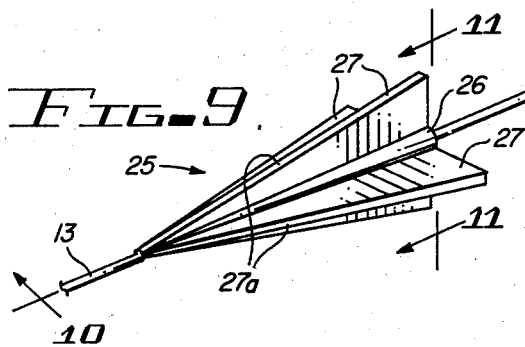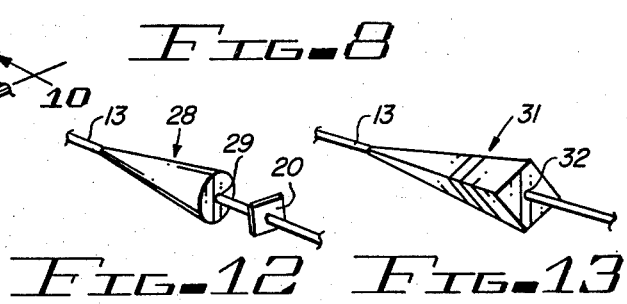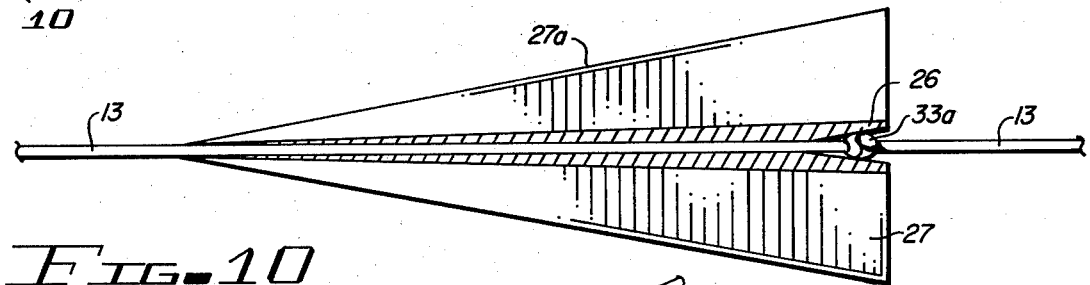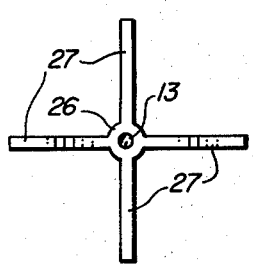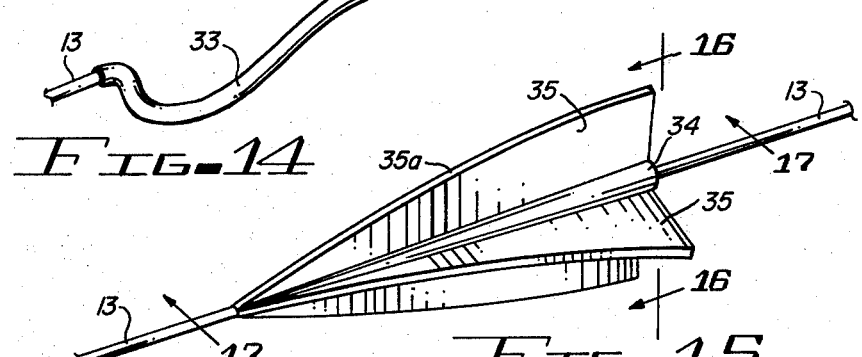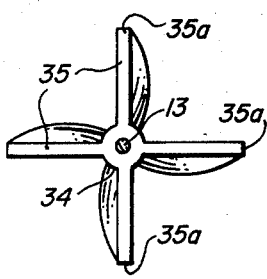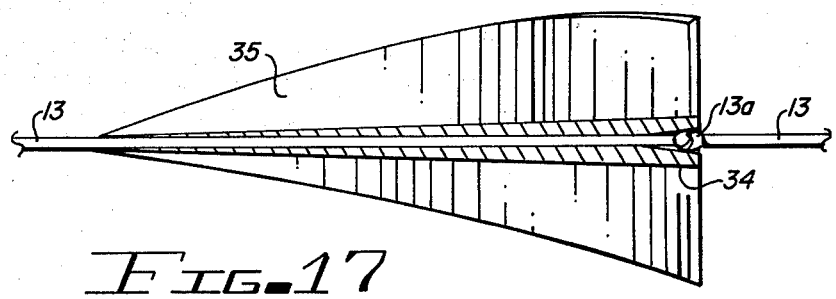

TOY PARACHUTE RELEASABLE FROM A KITE STRING

This invention relates to an improved toy parachute for traveling up a string, in particular a kite string, with the wind and for being released for free descent to the ground upon jerking of the string.

In another respect this invention relates to a toy parachute which may be optionally used in combination with other toy flight devices which engage the toy parachute while the parachute travels up the string, and then disengage from the toy parachute after the toy parachute is released from the kite string such that the flight device and toy parachute separately free flight to the ground.

In still another respect this invention relates to an improved toy parachute which may be optionally used in combination with a release device which is mounted on the string and disengages the toy parachute from the string for free flight to the ground.

Retaining clips which are attached to a kite string and carry toy parachutes or other flight devices and travel up a kite string by action of the wind against the toys and which then release the toys on contacting a fixed abutment in the kite string are well known in the art. For example, see U.S. Pat. No. 2,469,449 to Baskin, U.S. Pat. No. 2,471,199 to Coyne, and U.S. Pat. No. 2,473,213 to Nissen. After such known carrying clips strike the abutment in the string and release the toy flight devices into the air, the clip remains on and travels down the string toward the person holding the kite string.

Although such known carrying clips are of simple construction and place relatively little weight on the string in addition to the flight device being carried by the clip, because of the fixed position of the release abutment on the string a person flying a kite has no convenient control as to when the toy flight device may be released. If a person desires to alter the release position he must reel in the kite and reposition the abutment along the string. In solution of this problem there is prior art apparatus which allows a person flying a kite some measure of immediate control in determining where along the kite line the carrying clip is to release the toys. This particular prior art apparatus allows some measure of control in determining the release position by, after the carrying clip is in the desired position, providing a release abutment which is placed on the kite string, is pushed up the string by the wind, and strikes the clip to release the toy flight devices. However, with this apparatus the carrying clip still remains on the string and the position of the clip may change while the release abutment is traveling up the string.

The foregoing prior art devices, which employ a carrying clip which remains on the string after release of the toys attached to the clip, were improved upon by further prior art apparatus wherein a person can attach a toy parachute to a kite string and both release the toy parachute at whatever point he wishes and release the toy without having a carrying device remain on the kite line. In this particular prior art apparatus, a hook, attached to the canopy of the toy parachute, is placed on the kite string. The wind then carries the parachute up along the kite line, and the hook is released by jerking the kite string. See U.S. Pat. No. 3,871,605 by Kupperman et al.

There are two problems generally associated with this last prior art device. First, connecting the hook to the canopy of the parachute causes the weight attached to the shroud lines of the parachute to tend to pull the canopy opening or mouth toward the ground, so that the mouth of the canopy does not effectively catch the wind. Second, if the weight carried by the shroud lines is lightened so the canopy can more easily position itself to catch the wind, the canopy has a tendency to rise and pull the hook off the kite line prior to the time a person desires to release the toy parachute into free flight.

Another drawback of the prior art toy parachute is that it cannot carry and release additional flight devices as can the prior art carrying clip devices which remain on the kite string after the toy flight devices have been released from the clip.

Lastly, if the prior art toy parachute is attached to and travels up an unusually long expanse of kite string, jerking the hook off the string tends to be more difficult.

Accordingly, it would be advantageous to provide an improved toy parachute which would attach to a kite string, travel up the string with the wind and be releasable with a jerk of the string, and yet would allow the canopy of the parachute to freely position itself with and catch the wind.

It would also be advantageous to provide such a toy parachute which could optionally be used in combination with and carry another flight device while traveling up the kite line and, when the toy parachute was released from the string, which would separate from the other flight device so that both would free flight to the ground.

It would further be highly desirable to provide a release device that could be mounted on the kite line and, especially in the case of an unusually long kite string, could be used in combination with and to release the improved toy parachute from the string.

It is therefore a principal object of the present invention to provide an improved toy parachute which can be attached to a kite string so that the parachute canopy can freely position itself with and catch the wind, and which can travel up the string with the wind and be released by jerking the kite line.

Another object of the present invention is to provide a toy parachute which can optionally be used in combination with and carry another flight device while traveling up the kite string and, once the toy parachute is released from the string, which can separate from the flight device so that the flight device and toy parachute separately descend to the ground.

It is yet another object of the present invention to provide a toy parachute which can optionally be used in combination with a release device mounted along the kite string, wherein the release device will disengage the toy parachute from the kite line.

These and other, further and more specific objects and advantages of the invention will become apparent from the following detailed description thereof, taken in conjunction with the drawings, in which:

FIG. 1 is a perspective view illustrating the mode of operation of a toy parachute embodying the present invention in optional combination with a toy glider;

FIG. 2 is an enlarged perspective view of the glider and toy parachute of FIG. 1;

FIG. 3 is a sectional view of the toy parachute and glider of FIG. 2 taken along section line 3—3;

FIG. 4 is a partial perspective view of the presently preferred embodiment of the invention;

FIG. 5 is a partial perspective view illustrating an optional wheel and axle assembly being used to attach the toy parachute to a kite string;

FIG. 6 is a sectional view of the optional wheel and axle of FIG. 5 taken along section line 6—6;

FIG. 7 is a perspective view illustrating the toy parachute optionally combined with a toy glider;

FIG. 8 is a sectional view of the toy parachute and toy glider of FIG. 7 taken along section line 8—8;

FIG. 9 is a perspective view of the preferred embodiment of a release device to be used in combination with the toy parachute;

FIG. 10 is a sectional view of the release device of FIG. 9 taken along section line 10—10;

FIG. 11 is a rear view of the release device of FIG. 9;

FIG. 12 is a perspective view of an alternate embodiment of the release device;

FIG. 13 is a perspective view of another embodiment of the release device;

FIG. 14 is a perspective of a further embodiment of the release device;

FIG. 15 is a perspective of yet another embodiment of the release device;

FIG. 16 is a rear view of the release device of FIG. 15; and

FIG. 17 is a sectional view of the release device of FIG. 15 taken along line 17—17.

Briefly, in accordance with my invention, I provide an improved toy parachute for being attached to and traveling up a kite string with the wind and for being released from said string for free flight to the ground.

The toy parachute consists of a weight, a parachute having a canopy and a plurality of shroud lines, the shroud lines being separately attached to the canopy at their upper ends and attached to the weight at their lower ends, and of attachable means, connected to the weight, for movably engaging the kite string and being releasable from the string into the air when the string is jerked.

The toy parachute may be used in combination with another toy flight device, such toy flight device being comprised of at least one member having surfaces generally shaped, contoured and dimensioned such that movement of the flight device through the air provides aerodynamic lift for the device, and of means for engaging the weight of the toy parachute while the attachable means of the toy parachute is in contact with the string and responsive when the attachable means is released from the string into the air to disengage from the weight, such that the flight device and the toy parachute separately free flight to the ground.

In addition, the toy parachute may be used in combination with a release device for disengaging the attachable means from the string and for releasing the toy parachute for free flight to the ground. The release device consists of an elongate member adapted to be mounted on the string and having at least one surface generally shaped, contoured and dimensioned such that the attachable means of the toy parachute traveling along the string tracks onto and off the surface into the air and the toy parachute is released into free flight, and of means for positioning the elongate member along the string.

Turning now to the drawings, which are provided for the purpose of illustrating the practice of the invention and which do not constitute limitations on the scope thereof, FIG. 1 illustrates the presently preferred embodiment of the invention, generally indicated by the reference character 10, optionally carrying a toy glider 11 and attached to the kite string 13. The string 13 is connected to a kite 14 at its upper end and held by a person 15 at its lower end. The kite line 13 may be optionally connected to a pole 14a.

As shown in FIGS. 2-4, the presently preferred embodiment of the invention consists of a parachute canopy 15, with a plurality of shroud lines 16 attached at their upper ends to the canopy 15 and at their lower ends to a weight 17 with feet 17a. A hook member 18 is adapted to be attached to the weight 17.

As illustrated in FIG. 3, the glider 11 is adapted to be carried by the weight 17 by means of an aperture 19 sized to accept passage of the hook 18 and sized to prevent passage of the feet 17a of the weight 17.

In operation, the glider 11 rests on the feet 17a of the weight 17 while the hook member 18 travels up the string 13. When the string 13 is jerked and the hook member 18 released, the toy parachute 10 and glider 11, after disengaging, separately free flight to the ground.

Alternate pulley means, generally indicated by the reference number 12, of engaging the string 13 is shown attached to the weight 17 in FIGS. 5 and 6. The alternate means 12 consists of a grooved pulley 19 and aperture 21 through the center of the pulley 19 which receives an arm 23 of an axle member 22. The arm 22b of axle member 22 connects axle member 22 to the weight 17.

In FIGS. 7 and 8 a toy glider 23 is optionally carried by the toy parachute 10. The toy glider 23 is provided with an aperture 24 sized to receive the grooved wheel 19 and member 22 and sized to prevent passage of the feet 17a of the weight 17. In operation, when the kite string 13 is jerked and the toy parachute 10 is released from the kite string 13, the wheel 19 and member 22 pass through the aperture 24 so that the toy parachute 10 and the toy glider 23 separate and individually free flight to the ground.

FIGS. 9-11 illustrate the presently preferred embodiment of the release device to be used in combination with the toy parachute. The release device, generally indicated by the reference character 25, is comprised of a hollow elongate conical member 26 provided with four outwardly projecting depending fins 27. The fins 27 are generally evenly spaced about the circumference of the conical member 26 and have leading surfaces 27a beginning generally adjacent and parallel to and linearly diverging away from the string 13. The release device 25 is positioned along the string by a knot 13a.

When the release device 25 is used in combination with the toy parachute 10, the hook member 18 or pulley means 12, after tracking along the string 13 and onto an outer edge 27a of fin 27, travel off the edge 27a into the air allowing the toy parachute 10 to free flight to the ground.

FIG. 12 illustrates another embodiment of the release device and includes an elongate conically shaped member 28 with a cylindrical aperture 29 extending linearly from the tip of member 28 to the center of the base of the member 28. The member 28 is optionally slidably and rotatably mounted on the string 13. A stop 20 positions the release device along the string 13.

FIG. 13 illustrates yet another embodiment of the release device and includes an elongate pyramid shaped member 31 with a cylindrical aperture 32 extending linearly from the tip of the member 31 to the center of the base of the member 31. The member 31 is optionally slidably and rotatably mounted on the string 13.

FIG. 14 illustrates still another embodiment of the release device and includes a generally U-shaped hollow tubing 33 mounted on the string 13. The tubing 33 may be manually moved along the string 13, but friction between the string 13 and tubing 33 otherwise holds the tubing 33 in place along the string 13.

FIG. 15 illustrates a further embodiment of the release device including an elongate hollow conical member 34 with four outwardly projecting depending triangular fins 35. Leading surfaces 35a of the fins 35 begin generally adjacent and parallel to and curvingly diverge from the string 13.

As will be apparent to those skilled in the art the release device embodiments illustrated in FIGS. 12-17 can be utilized in combination with the toy parachute 10 of FIGS. 1-8 to release the toy parachute 10 into free flight to the ground.

Having described my invention in such full, clear, concise and exact terms as to enable those skilled in the art to which it pertains to understand and practice it, and having described the presently preferred embodiments thereof, I claim:

1. In combination with a toy parachute for being attached to and traveling up a kite string with the wind and for being released from said string for free flight to the ground, said toy parachute including, a weight,
a parachute having a canopy and a plurality of shroud lines, said shroud lines being separately attached to said canopy at their upper ends and attached to said weight at their lower ends,
carrier means, connected to said weight, for movably engaging said kite string, and
means for releasing said carrier means from said string into the air for free flight to the ground,
a device for flight, comprising,
  (a) at least one member having
    (i) surfaces generally shaped, contoured and dimensioned such that movement of said device through the air provides aerodynamic lift for said device, and
    (ii) an aperture sized to permit said carrier means to pass therethrough and engage said string, and
  (b) means contacting said weight when said carrier means is engaging said string for preventing passage of said weight through said aperture,
said device responsive when said carrier means is released from said string into the air to allow said carrier means to pass through said aperture and to disengage said weight from said device such that said device and said toy separately free flight to the ground.

* * * * *